United States Patent
Jin et al.

(10) Patent No.: US 11,392,838 B2
(45) Date of Patent: Jul. 19, 2022

(54) METHOD, EQUIPMENT, COMPUTING DEVICE AND COMPUTER-READABLE STORAGE MEDIUM FOR KNOWLEDGE EXTRACTION BASED ON TEXTCNN

(71) Applicant: Ping An Technology (Shenzhen) Co., Ltd., Guangdong (CN)

(72) Inventors: Ge Jin, Guangdong (CN); Liang Xu, Guangdong (CN); Jing Xiao, Guangdong (CN)

(73) Assignee: Ping An Technology (Shenzhen) Co., Ltd., Guangdong (CN)

( * ) Notice: Subject to any disclaimer, the term of this patent is extended or adjusted under 35 U.S.C. 154(b) by 411 days.

(21) Appl. No.: 16/635,554

(22) PCT Filed: May 31, 2019

(86) PCT No.: PCT/CN2019/089563
§ 371 (c)(1),
(2) Date: Jan. 31, 2020

(87) PCT Pub. No.: WO2020/140386
PCT Pub. Date: Jul. 9, 2020

(65) Prior Publication Data
US 2021/0216880 A1 Jul. 15, 2021

(30) Foreign Application Priority Data
Jan. 2, 2019 (CN) .......................... 201910002638.1

(51) Int. Cl.
*G06N 5/02* (2006.01)
*G06N 20/10* (2019.01)
(Continued)

(52) U.S. Cl.
CPC ............. *G06N 5/02* (2013.01); *G06K 9/6201* (2013.01); *G06K 9/6232* (2013.01);
(Continued)

(58) Field of Classification Search
CPC ............ G06N 5/02; G06N 3/08; G06N 20/10; G06K 9/6201; G06K 9/6232;
(Continued)

(56) References Cited

U.S. PATENT DOCUMENTS

2018/0268023 A1* 9/2018 Korpusik ............... G06N 5/022

FOREIGN PATENT DOCUMENTS

| CN | 202534501 | 11/2012 |
|---|---|---|
| CN | 205282279 | 6/2016 |

(Continued)

OTHER PUBLICATIONS

International Search Report issued by CIPO for corresponding international application No. PCT/CN2019/089563 dated Aug. 27, 2019.

(Continued)

*Primary Examiner* — Casey L Kretzer
(74) *Attorney, Agent, or Firm* — Renner, Otto, Boisselle & Sklar, LLP

(57) ABSTRACT

The application discloses a method for knowledge extraction based on TextCNN, comprising: S10, collecting first training data, and constructing a character vector dictionary and a word vector dictionary; S20, constructing a first convolutional neural network, and training the first convolutional neural network based on a first optimization algorithm, the first convolutional neural network comprises a first embedding layer, a first multilayer convolution, and a first softmax function connected in turn; S30, constructing a second convolutional neural network, and training the second convolutional neural network based on a second optimization algorithm, the second convolutional neural network comprises a second embedding layer, a second multilayer convolution, a pooling layer, two fully-connected layers and a second softmax function, the second embedding layer con- (Continued)

nected in turn; S40, extracting a knowledge graph triple of the to-be-predicted data according to an entity tagging prediction output by the first trained convolutional neural network and an entity relationship prediction output by the second trained convolutional neural network.

16 Claims, 2 Drawing Sheets

(51) Int. Cl.
 *G06K 9/62* (2022.01)
 *G06N 3/08* (2006.01)
(52) U.S. Cl.
 CPC ......... *G06K 9/6256* (2013.01); *G06K 9/6261* (2013.01); *G06K 9/6288* (2013.01); *G06K 9/6296* (2013.01); *G06N 3/08* (2013.01); *G06N 20/10* (2019.01)
(58) Field of Classification Search
 CPC .. G06K 9/6256; G06K 9/6261; G06K 9/6288; G06K 9/6296
 See application file for complete search history.

(56) References Cited

FOREIGN PATENT DOCUMENTS

| CN | 107031946 | 8/2017 |
| CN | 108563779 | 9/2018 |
| CN | 207818360 | 9/2018 |
| CN | 109815339 | 5/2019 |
| JP | 2005203551 | 7/2005 |
| WO | 2016165082 | 10/2016 |

OTHER PUBLICATIONS

JW _S . "Convolutional Neural Networks for Sentence Classification," https://www.cnblogs.com/jws-2018/p/9465605.html, Aug. 13, 2018 (Aug. 13, 2018), pp. 1-3.

Kim, Y., "Convolutional Neural Networks for Sentence Classification," Proceedings of the 2014 Conference on Empirical Methods in Natural Language Processing (EMNLP), Oct. 29, 2014 (Oct. 29, 2014), pp. 1746-1751.

International Search Report and Written Opinion issued by WIPO for corresponding patent application No. PCT/CN2018/089563 dated Jul. 25, 2019.

\* cited by examiner

METHOD, EQUIPMENT, COMPUTING DEVICE AND COMPUTER-READABLE STORAGE MEDIUM FOR KNOWLEDGE EXTRACTION BASED ON TEXTCNN

This present disclosure declares priority of the Chinese patent application with number 201910002638. 1, filed on Jan. 2, 2019, entitled "Method, equipment, computing device and computer-readable storage medium for knowledge extraction based on TextCNN". Entire content of the Chinese patent application is incorporated in the present disclosure by reference.

BACKGROUND

Technical Field

The present disclosure relates to a field of knowledge graph, in particular to a method, equipment, computing device and computer-readable storage medium for knowledge extraction.

Background Information

Developments and applications of intelligent customer service robots at home and abroad have shown a rapid growth momentum in recent years, and gradually began to form industrial scale in telecommunications operators, financial services and other industries. Intelligent customer service dialogue not only establishes a fast and effective communication means for enterprises and users, but also provides statistical analysis information required for the refined management of enterprises.

Knowledge graph is an efficient form of information storage and reading, which can be effectively applied to customer service robot scenarios. Through the knowledge graph, a customer service robot can provide corresponding responses or services according to chat contents to improve user experience and knowledge extraction. That is, knowledge extracted from data with different sources and different structures forms knowledge (which is structured format) and stores in the knowledge graph. Knowledge extraction is the most critical and the most important step in a process of constructing the knowledge graph. However, an existing constructing process of knowledge extraction is cumbersome. If importing entity and relationship information by a manual form, a lot of resources will be consumed.

SUMMARY

Purpose of the present disclosure is to provide a method, equipment, computing device and computer-readable storage medium for knowledge extraction based on TextCNN, which are used to solve problems existing in the prior art.

To realize the purpose, the present disclosure provides a method for knowledge extraction based on TextCNN, comprising the following steps:

S10, collecting a first training data, and constructing a character vector dictionary and a word vector dictionary;

S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn;

S21, collecting a second training data, wherein the second training data is pre-labeled data, comprising a named entity position label and a named entity relationship label, and inputting the second training data into the first embedding layer after the second training data is divided into multiple characters and special symbols are removed;

S22, performing character vector matching on the second training data with character-level, based on the character vector dictionary, in the first embedding layer, to convert the second training data into a matrix form;

S23, wherein, the first multilayer convolution performs a convolution operation on a matrix output from the first embedding layer, the first multilayer convolution comprises one group of first-type one-dimensional convolution layer located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S24, outputting the first multi-layer convolution via the first softmax function to determine prediction probabilities of BEMO tagging with a plurality of subdivision categories of each character, wherein, B represents beginning of an entity, M represents middle of the entity, E represents end of the entity and O represents a non-entity;

S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network;

S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn;

S31, segmenting the second training data into words;

S311, performing a preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard;

S312, inputting the second training data into the second embedding layer after special symbols and non-Chinese characters in the preliminary word segmentation are removed;

S32, performing word vector matching on the second training data after segmenting, based on the word vector dictionary, in the second embedding layer, to convert the second training data into the matrix form;

S33, wherein the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S34, inputting an output of the second multilayer convolution into the pooling layer for compression;

S35, inputting an output of the pooling layer into two fully-connected layers to perform information fusion of each channel;

S36, inputting an output of the fully-connected layers to the second softmax function to determine corresponding prediction probabilities of multiple entity relationship labels;

S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network;

S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probabilities of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

The present disclosure also provides an equipment for knowledge extraction based on TextCNN, comprising:

a character vector dictionary construction module, configured to construct a character vector dictionary according to a first training data collected;

a word vector dictionary construction module, configured to construct a word vector dictionary according to the first training data collected;

a first convolutional neural network construction and training module, configured to construct a first convolutional neural network, and train the first convolutional neural network based on a first optimization algorithm, the first convolutional neural network comprises a first embedding layer, a first multilayer convolution, and a first softmax function, wherein the first embedding layer, the first multilayer convolution, and the first softmax function are connected in turn, wherein the first convolutional neural network constructing and training module comprises:

a character vector pre-processing unit, configured to input a second training data into the first embedding layer after the second training data is divided into multiple characters and special symbols are removed, the second training data is pre-labeled data, comprising a named entity position label and a named entity relationship label;

a character vector matrix unit, configured to perform character vector matching on the second training data with character-level, based on the character vector dictionary, in the first embedding layer, to convert the second training data into a matrix form;

a first multilayer convolution unit, configured to perform a convolution operation on a matrix output from the first embedding layer, the first multilayer convolution comprises one group of first-type one-dimensional convolution layers located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

a first softmax function outputting unit, configured to output the first multi-layer convolution via the first softmax function to determine prediction probabilities of BEMO tagging with a plurality of subdivision categories of each character;

a first convolutional neural network training unit, configured to calculate a first cross-entropy of a loss function according to the prediction probability of BEMO tagging and a true BEMO label of the second training data, and minimize the first loss function through the first optimization algorithm to train the first convolutional neural network;

a second convolutional neural network construction and training module, configured to construct a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn, wherein the second convolutional neural network constructing and training module comprises:

a word vector dictionary pre-processing unit, configured to segment the second training data into words, wherein the word vector dictionary pre-processing unit comprises:

a preliminary word segmentation subunit, configured to perform preliminary word segmentation on the second training data using a jieba library, and correct the preliminary word segmentation based on a prediction word segmentation of the first convolutional neural network, if the preliminary word segmentation is different from the predicted word segmentation of the first convolutional neural network, take the predicted word segmentation of the first convolutional neural network as standard;

a word segmentation pre-processing subunit, configured to input the second training data into the second embedding layer after special symbols and non-Chinese characters in the preliminary word segmentation are removed;

a word vector matrix unit, configured to perform word vector matching on the second training data after segmenting, based on the word vector dictionary, in the second embedding layer, to convert the second training data into the matrix form;

a second multilayer convolution unit, configured to perform the convolution operation on the matrix output from the second embedding layer, the second multilayer convolution comprises one group of first-type one-dimensional convolution layers located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

the pooling layer, configured to input an output of the second multilayer convolution to the pooling layer for compression;

the fully-connected layers, configured to input an output of the pooling layer into two fully-connected layers to perform information fusion of each channel of the channels;

a second softmax function outputting unit, configured to input an output of the fully-connected layers into the second softmax function to determine corresponding prediction probabilities of multiple entity relationship labels;

a second convolutional neural network training unit, configured to calculate a second cross-entropy of the loss function according to predicted probability of a relationship label output by the second convolutional neural network and a true relationship label of the second training data, and minimize the loss function through the second optimization algorithm to train the second convolutional neural network;

a knowledge graph triplet extraction module, configured to input to-be-predicted data into the first convolutional neural network after training and the second convolutional neural network after training, extracting a knowledge graph triple of the to-be-predicted data according to an entity label prediction output by the first convolutional neural network after training and an entity relationship prediction output by the second convolutional neural network after training, wherein a class corresponding to the maximum probability value in the prediction probability of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

To achieve above object, the present disclosure also provides a computing device, the computing device comprising: a storage; a processor; and computer programs that are stored in the storage unit and executed on the processor, wherein the processor executes the computer programs for implementing steps of a method for knowledge extraction based on TextCNN, the method comprising:

S10, collecting first training data, and constructing a character vector dictionary and a word vector dictionary;

S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn;

S21, collecting second training data, wherein the second training data is pre-labeled data, comprising a named entity position label and a named entity relationship label, and inputting the second training data into the first embedding layer after the second training data is divided into multiple characters and special symbols are removed;

S22, performing character vector matching on the second training data with character-level, based on the character vector dictionary, in the first embedding layer, to convert the second training data into a matrix form;

S23, wherein, the first multilayer convolution performs a convolution operation on a matrix output from the first embedding layer, the first multilayer convolution comprises one group of first-type one-dimensional convolution layer located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S24, outputting the first multi-layer convolution via the first softmax function to determine prediction probabilities of BEMO tagging with a plurality of subdivision categories of each character;

S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network;

S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn;

S31, segmenting the second training data into words;

S311, performing a preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard;

S312, inputting the second training data into the second embedding layer after special symbols and non-Chinese characters in the preliminary word segmentation are removed;

S32, performing word vector matching on the second training data after segmenting, based on the word vector dictionary, in the second embedding layer, to convert the second training data into the matrix form;

S33, wherein, the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S34, inputting an output of the second multilayer convolution into the pooling layer for compression;

S35, inputting an output of the pooling layer into two fully-connected layers to perform information fusion of each channel;

S36, inputting an output of the fully-connected layers into the second softmax function to determine corresponding prediction probabilities of multiple entity relationship labels;

S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network;

S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probabilities of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

To achieve above object, the present disclosure also provides a computer readable storage medium, storing computer programs thereon, the computer programs executed by a processor to implement steps of a method for knowledge extraction based on TextCNN, the method comprising:

S10, collecting first training data, and constructing a character vector dictionary and a word vector dictionary;

S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn;

S21, collecting second training data, wherein the second training data is pre-labeled data, comprising a named entity position label and a named entity relationship label, and inputting the second training data into the first embedding layer after the second training data is divided into multiple characters and special symbols are removed;

S22, performing character vector matching on the second training data with character-level, based on the character vector dictionary, in the first embedding layer, to convert the second training data into a matrix form;

S23, wherein, the first multilayer convolution performs a convolution operation on a matrix output from the first embedding layer, the first multilayer convolution comprises one group of first-type one-dimensional convolution layer located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S24, outputting the first multi-layer convolution via the first softmax function to determine prediction probabilities of BEMO tagging with a plurality of subdivision categories of each character;

S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network;

S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn;

S31, segmenting the second training data into words;

S311, performing a preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard;

S312, inputting the second training data into the second embedding layer after special symbols and non-Chinese characters in the preliminary word segmentation are removed;

S32, performing word vector matching on the second training data after segmenting, based on the word vector dictionary, in the second embedding layer, to convert the second training data into the matrix form;

S33, wherein, the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S34, inputting an output of the second multilayer convolution into the pooling layer for compression;

S35, inputting an output of the pooling layer into two fully-connected layers to perform information fusion of each channel;

S36, inputting an output of the fully-connected layers into the second softmax function to determine corresponding prediction probabilities of multiple entity relationship labels;

S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network;

S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probabilities of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

The method, equipment, computing device and computer-readable storage medium for knowledge extraction based on TextCNN provided and shown by the present disclosure implement a knowledge extraction link in a knowledge graph through a convolutional neural network, which effectively improves model training efficiency on the premise of ensuring accuracy. By converting the training text into a vector form and connecting to two types of convolutional neural network models, wherein convolutional layer forms of the two types of the convolutional neural network models are both one-dimensional convolution kernels, training text information can be extracted, named entity recognition and entity relationship recognition are realized respectively. Computing resources can be made full use of to improve computing efficiency due to parallel computing characteristics of convolutional neural networks, and the two types of trained convolutional neural network models implement automatic knowledge extraction through prediction fusion.

Specifically, the to-be-predicted data is respectively converted into a character vector form and a word vector form, and connected to the first convolutional neural network and the second convolutional neural network to be processed, wherein the first convolutional neural network is used to realize the named entity recognition. Form of the convolutional neural network used is a form of full convolution, whose input is a character vector and whose output is an entity category boundary prediction. Through this process, original continuous text can be segmented into characters, and the characters related to the named entity can be kept and entity classification is performed. The second convolutional neural network realizes the knowledge extraction. The convolutional neural network used includes convolutional layers, pooling layers and so on, whose input includes character vectors and word vectors, and whose output is the relationship extraction recognition. Through this process, associations of knowledge entities in the text can be determined. Combining the entity tagging prediction with entity relationship prediction of the to-be-predicted data, entities and relationships existing in the entity tagging prediction and entity relationship prediction of the to-be-predicted data can be recognized, and the entities and relationships can be used to the knowledge graph triples extraction of the to-be-predicted data. Thereby, automatic knowledge extraction is realized, and the efficiency of model training is effectively improved on the premise of ensuring accuracy.

DETAILED DESCRIPTION

In order to make purpose, technical solution, and advantages of present disclosure more clearly, the present disclosure is described in further detail below with reference to the accompanying drawings and embodiments. It should be understood that the specific embodiments described herein are only used to explain the disclosure, and are not used to limit the disclosure. Based on the embodiments in the present disclosure, all other embodiments obtained by a person of ordinary skill in the art without any creative efforts shall fall within the protection scope of the present disclosure.

Embodiment 1

Figure 1:
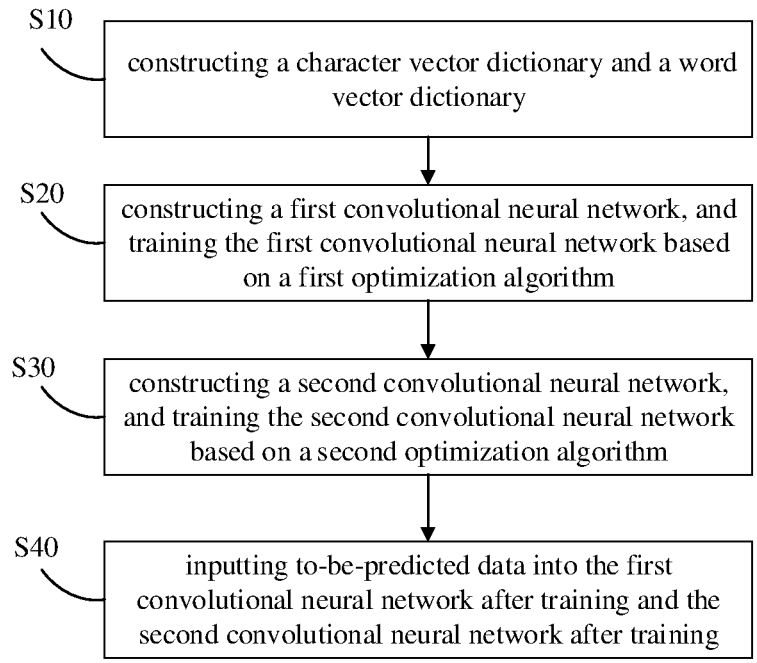
FIG. 1 illustrates a flowchart of a method for knowledge extraction based on TextCNN according to an embodiment of the present disclosure.

Referring to FIG. 1, which illustrates a method for knowledge extraction based on TextCNN, comprising the following steps:

S10, collecting a first training data, and constructing a character vector dictionary and a word vector dictionary.

In a preferred embodiment, the S10 comprises:

S11, inputting the first training data collected into a Word2Vec algorithm for training to obtain character vectors and construct the character vector dictionary after the first training data collected is divided into characters and special symbols are removed and non-Chinese characters are removed;

S12, at the same time, inputting the first training data collected into a Word2Vec algorithm for training to obtain word vectors and construct the word vector dictionary after the first training data collected is segmented into words and special symbols are removed and non-Chinese characters are removed.

The method for knowledge extraction shown based on TextCNN in the present disclosure firstly obtains a character vector dictionary and a word vector dictionary, that is, the corresponding relationships among characters, words and vectors are determined. The character vectors and word vectors are constructed separately. A first training text is Chinese Wikipedia. For the character vectors, firstly dividing the first training text into characters and removing special symbols and non-Chinese characters, and then inputting the processed text into the Word2Vec algorithm for training to obtain character vectors. For the word vectors, firstly segmenting the training text into words and removing special symbols and non-Chinese characters, and then inputting the processed text into the Word2Vec algorithm for training to obtain the word vectors. Dimensions of the character vectors and the word vectors are 300. Word segmentation involved in this step is implemented by a jieba library in Python, and the Word2Vec algorithm training involved in this step is implemented by a gensim library in Python.

S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn.

S21, collecting second training data, wherein the second training data is pre-labeled data, comprising a named entity position label and a named entity relationship label, and inputting the second training data into the first embedding layer after the second training data is divided into multiple characters and special symbols are removed.

S22, performing character vector matching on the second training data with character-level, based on the character vector dictionary, in the first embedding layer, to convert the second training data into a matrix form.

S23, wherein the first multilayer convolution performs a convolution operation on a matrix output from the first embedding layer, the first multilayer convolution comprises one group of first-type one-dimensional convolution layers located at a front portion, and at least one group of second-type one-dimensional convolution layer located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation.

In the embodiment, as a preferred solution, the first multilayer convolution comprises 5 convolution layers, wherein the 5 convolution layers include the first-type one-dimensional convolution layer and four groups of the second-type one-dimensional convolution layer. The first-type one-dimensional convolution layer comprises one-dimensional convolution kernels corresponding to three types of length, the one-dimensional convolution kernels of each length corresponds to 128 channels, four groups of the second-type one-dimensional convolution layers comprise one-dimensional convolution kernels of a length of 3, and number of channels of the one-dimensional convolution kernels corresponding to the four groups of the second-type one-dimensional convolution layers is 384.

S24, outputting the first multi-layer convolution via the first softmax function to determine prediction probabilities of BEMO tagging with a plurality of subdivision categories of each character.

S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network. The first optimization algorithm is an ADAM algorithm or an rmsprop algorithm.

In the S20, a second training text is different from the first training text of the character vectors and word vectors. A form of the second training text is a form of a short sentence and the second training text contains a named entity position label and a named entity relationship label, wherein in the named entity position label, each character is labeled with BMEO Chinese named entity boundary. In terms of preprocessing, in this step, the second training text is divided into characters and special symbols are removed, and a processed text is obtained, and the processed text is input into the first convolutional neural network. The first convolutional neural network performs character vector matching on the second training text with character-level in the embedding layer, thereby the second training text is converted into a matrix form, wherein each row of the matrix corresponds to a vector of a character. After the character vectors are matched, the first convolutional neural network can perform the convolution operation. In the embodiment, the first multilayer convolution is designed with a total of 5 convolution layers, and data of each convolution layer comes from output of previous convolutional layer. Among them, the first-type one-dimensional convolutional layer on the first layer includes three types of length of one-dimensional convolution kernels (the three types of length are 1, 3, and 5), the one-dimensional convolution kernels of each length corresponds to 128 channels, the remaining of the first-type one-dimensional convolution layers comprise one-dimensional convolution kernels of a length of 3, and number of channels of the one-dimensional convolution kernels corresponding to the remaining of the first-type one-dimensional convolution layers is 384. It should be noted that the number of matrix rows needs to be kept a constant during the operation of the convolution layer. The last convolution layer of the first multilayer convolution is output through the first softmax function, and the output is corresponding to a prediction probability of BEMO tagging of each character. The BEMO tagging includes a plurality of subdivision categories. Therefore, the first convolutional neural network calculates a probability of a character for each of the subdivision categories, such as a probability for "B_a place name", a probability for "B_a person name", and a probability for "E_a person name" and so on. After a model is constructed, the first convolutional neural network can be trained. During the training process, the cross-entropy of the loss function is calculated via algorithms according to the prediction probability of BEMO tagging of the first convolutional neural network and a true BEMO label of the second training text, and the loss function is minimized through an ADAM optimization algorithm to train the first convolutional neural network. It should be noted that this model may have a contradiction in character tagging prediction, so the model only extracts entities corresponding to the character tagging before and after. The first convolutional neural network is constructed based on a tensorflow library in Python. So far, constructing and training of the first convolutional neural network has been completed.

S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, the two-fully-connected layers and the second softmax function are connected in turn.

In the embodiment, the second convolutional neural network is constructed based on the tensorflow library in Python.

S31, segmenting the second training data into words.

S311, performing a preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard.

S312, inputting the second training data into the second embedding layer after special symbols and non-Chinese characters in the preliminary word segmentation are removed.

S32, performing word vector matching on the second training data after segmenting, based on the word vector dictionary, in the second embedding layer after the preliminary word segmentation, to convert the second training data into the matrix form.

S33, wherein the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is kept a constant during the convolution operation. In the embodiment, as a preferred solution, the second multilayer convolution comprises 3 convolution layers, wherein the 3 convolution layers include the first-type one-dimensional convolution layer and two groups of the second-type one-dimensional convolution layer. The first-type one-dimensional convolution layer comprises one-dimensional convolution kernels corresponding to three types of length, the one-dimensional convolution kernels of each length corresponds to 128 channels, two groups of the second-type one-dimensional convolution layer comprise one-dimensional convolution kernels of a length of 3, and number of channels of the one-dimensional convolution kernels corresponding to the two groups of the second-type one-dimensional convolution layers is 384.

S34, inputting an output of the second multilayer convolution into the pooling layer for compression.

S35, inputting an output of the pooling layer into two fully-connected layers to perform information fusion of each channel of the channels.

S36, inputting an output of the fully-connected layers into the second softmax function to determine corresponding prediction probabilities of multiple entity relationship labels.

S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network. In the embodiment, the second optimization algorithm is the ADAM algorithm or the rmsprop algorithm.

In the embodiment, training text used for constructing of the second convolutional neural network is the same as that of the first convolutional neural network, however a tagging used by the second convolutional neural network is not BEMO tagging, but a named entity relationship tagging. In terms of data preprocessing, because the first convolutional neural network has tagged the named entity boundary, but not tagged the non-named entity boundary, therefore, in this solution a jieba library is used to perform preliminary word segmentation on the training text, and a result of the preliminary word segmentation is corrected based on a recognition result of the first convolutional neural network, and finally special symbols and non-Chinese characters are removed.

After the training text being processed, the result of the preliminary word segmentation can be input into the second convolutional neural network, and word vector matching is performed in the embedding layer, wherein named entity vector which is not existed in the word vector dictionary is initialized to 0. The second multilayer convolution includes 3 convolution layers located at a front portion. Among them, the first-type one-dimensional convolutional layer on the first layer includes three types of length of one-dimensional convolution kernels (three types of length are 1, 3, and 5), the one-dimensional convolution kernels of each length corresponds to 128 channels, the remaining of the first-type one-dimensional convolution layers comprise one-dimensional convolution kernels corresponding to the same types of length, whose value is 3, and number of channels of the one-dimensional convolution kernels corresponding to the remaining of the first-type one-dimensional convolution layers is 384. It should be noted that the number of matrix rows needs to be kept a constant during the operation of the convolution layer. An output of the convolution operation is input into the pooling layer for compression, and the pooling form is Max-Pooling, the output of the pooling layer is input to two fully-connected layers to perform information fusion of each channel of the channels. the fully-connected layers output corresponding prediction probabilities of multiple labels in the form of the second softmax function, such as probability of "geographic relationship", probability of "subordinate relationship" and other types of labels. A model can be trained after being constructed. During the training process, the cross-entropy of the loss function is calculated via algorithms according to a relationship prediction of the model and a true relationship label, and the loss function is minimized through ADAM optimization algorithm to train the second convolutional neural network. The second convolutional neural network is constructed based on the tensorflow library in Python. So far, constructing and training of the second convolutional neural network has been completed in a scheme.

S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probability of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-bepredicted data. Furthermore, in the S40, if the entity tagging prediction and the entity relationship prediction contradict with each other, the knowledge graph triplet extraction of the to-be-predicted data is abandoned.

In this step, prediction results of two types of convolutional neural networks are fused. Because there may be contradictions in prediction results of the two types of convolutional neural networks, for example, for a sentence, the first convolutional neural network prediction includes a person entity, however the second convolutional neural network prediction belongs to "geographic relationship", therefore, only knowledge corresponding to prediction results of models of the two types of convolutional neural network is extracted in the scheme. For example, for one sentence, the first convolutional neural network prediction includes the person entity, and the second convolutional neural network prediction belongs to a "subordinate relationship", then the knowledge graph triple extraction is abandoned.

The method for knowledge extraction based on TextCNN provided and shown by the present disclosure implement a knowledge extraction link in a knowledge graph through a convolutional neural network, which effectively improves model training efficiency on the premise of ensuring accuracy. By converting the training text into a vector form and connecting to two types of convolutional neural network models, wherein convolutional layer forms of the two types of the convolutional neural network models are both one-dimensional convolution kernels, training text information can be extracted, named entity recognition and entity relationship recognition are realized respectively. Computing resources can be made full use of to improve computing efficiency due to parallel computing characteristics of convolutional neural networks, and the two types of trained convolutional neural network models implement automatic knowledge extraction through prediction fusion. Specifically, the to-be-predicted data is respectively converted into a character vector form and a word vector form, and connected to the first convolutional neural network and the second convolutional neural network to be processed, wherein the first convolutional neural network is used to realize the named entity recognition. Form of the convolutional neural network used is a form of full convolution, whose input is a character vector and whose output is an entity category boundary prediction. Through this process, original continuous text can be segmented into characters, and the characters related to the named entity can be kept and entity classification is performed. The second convolutional neural network realizes the knowledge extraction. The convolutional neural network used includes convolutional layers, pooling layers and so on, whose input includes character vectors and word vectors, and whose output is the relationship extraction recognition. Through this process, associations of knowledge entities in the text can be determined. Combining the entity tagging prediction with entity relationship prediction of the to-be-predicted data, entities and relationships existing in the entity tagging prediction and entity relationship prediction of the to-be-predicted data can be recognized, and the entities and relationships can be used to the knowledge graph triples extraction of the to-be-predicted data. Thereby, automatic knowledge extraction is realized, and the efficiency of model training is effectively improved on the premise of ensuring accuracy.

Embodiment 2

Figure 2:
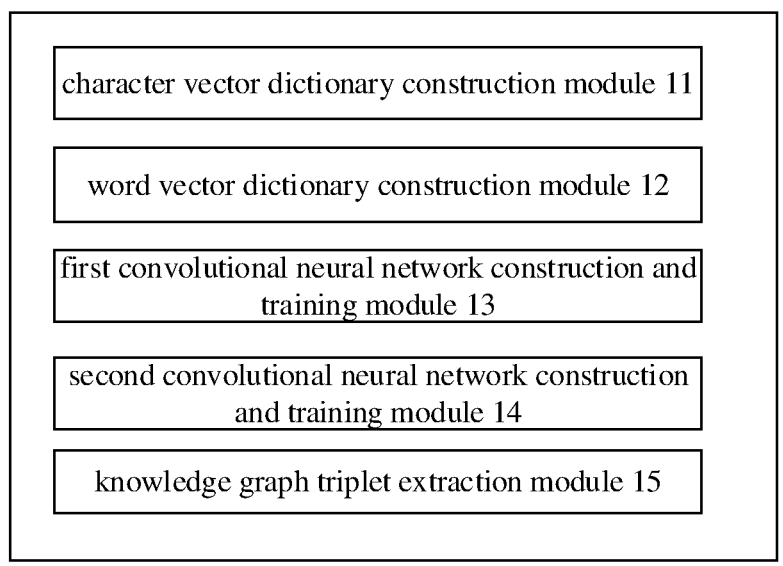
FIG. 2 illustrates a block diagram of program modules of an equipment for knowledge extraction based on TextCNN according to an embodiment of the present disclosure.

Please continue referring to FIG. 2, the present disclosure shows a device for knowledge extraction based on TextCNN 10, for implementing the method for knowledge extraction based on TextCNN of the embodiment 1, based on the embodiment 1, which includes functions of various program modules. In the embodiment, the device for knowledge extraction based on TextCNN 10 may include or be divided into one or more program modules, and the one or more program modules are stored in a storage medium and executed by one or more processors to complete the present disclosure and implement the above method for knowledge extraction based on TextCNN. The program modules referred in the present disclosure refers to a series of computer program instruction segments capable of performing specific functions, which is more suitable for describing the executing process in the storage medium of the device for knowledge extraction based on TextCNN than the program itself. The following description will specifically introduce functions of the program modules of the embodiment:

The present disclosure also provides a device for knowledge extraction based on TextCNN 10, comprising:

a character vector dictionary construction module 11, configured to construct a character vector dictionary according to a first training data collected;

a word vector dictionary construction module 12, configured to construct a word vector dictionary according to the first training data collected;

a first convolutional neural network construction and training module 13, configured to construct a first convolutional neural network, and train the first convolutional neural network based on a first optimization algorithm, the first convolutional neural network comprises a first embedding layer, a first multilayer convolution, and a first softmax function, wherein the first embedding layer, the first multilayer convolution, and the first softmax function are connected in turn, wherein the first convolutional neural network constructing and training module comprises:

a character vector pre-processing unit, configured to input a second training data into the first embedding layer after the second training data is divided into multiple characters and special symbols are removed, the second training data is pre-labeled data, comprising a named entity position label and a named entity relationship label;

a character vector matrix unit, configured to perform character vector matching on the second training data with character-level, based on the character vector dictionary, in the first embedding layer, to convert the second training data into a matrix form;

a first multilayer convolution unit, configured to perform a convolution operation on a matrix output from the first embedding layer, the first multilayer convolution comprises one group of first-type one-dimensional convolution layers located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

a first softmax function outputting unit, configured to output the first multi-layer convolution via the first softmax function to determine prediction probabilities of BEMO tagging with a plurality of subdivision categories of each character;

a first convolutional neural network training unit, configured to calculate a cross-entropy of a loss function according to the prediction probability of BEMO tagging and a true BEMO label of the second training data, and minimize the first loss function through the first optimization algorithm to train the first convolutional neural network;

a second convolutional neural network construction and training module 14, configured to construct a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn, wherein the second convolutional neural network constructing and training module comprises:

a word vector dictionary pre-processing unit, configured to segment the second training data into words, wherein the word vector dictionary pre-processing unit comprises:

a preliminary word segmentation subunit, configured to perform preliminary word segmentation on the second training data using a jieba library, and correct the preliminary word segmentation based on a prediction word segmentation of the first convolutional neural network, if the preliminary word segmentation is different from the predicted word segmentation of the first convolutional neural network, take the predicted word segmentation of the first convolutional neural network as standard;

a word segmentation pre-processing subunit, configured to input the second training data into the second embedding layer after special symbols and non-Chinese characters in the preliminary word segmentation are removed;

a word vector matrix unit, configured to perform word vector matching on the second training data after segmenting, based on the word vector dictionary, in the second embedding layer, to convert the second training data into the matrix form;

a second multilayer convolution unit, configured to perform the convolution operation on the matrix output from the second embedding layer, the second multilayer convolution comprises one group of first-type one-dimensional convolution layers located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

the pooling layer, configured to input an output of the second multilayer convolution to the pooling layer for compression;

the fully-connected layers, configured to input an output of the pooling layer into two fully-connected layers to perform information fusion of each channel of the channels;

a second softmax function outputting unit, configured to input an output of the fully-connected layers into the second softmax function to determine corresponding prediction probabilities of multiple entity relationship labels;

a second convolutional neural network training unit, configured to calculate a second cross-entropy of the loss function according to predicted probability of a relationship label output by the second convolutional neural network and a true relationship label of the second training data, and minimize the loss function through the second optimization algorithm to train the second convolutional neural network;

a knowledge graph triplet extraction module 15, configured to input to-be-predicted data into the first convolutional neural network after training and the second convolutional neural network after training, extracting a knowledge graph triple of the to-be-predicted data according to an entity label prediction output by the first convolutional neural network after training and an entity relationship prediction output by the second convolutional neural network after training, wherein a class corresponding to the maximum probability value in the prediction probability of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

Preferably, the character vector dictionary construction module 11, configured to input the first training data collected into a Word2Vec algorithm for training to obtain character vectors and construct the character vector dictionary after the first training data collected is divided into characters and special symbols are removed and non-Chinese characters are removed;

Preferably, the word vector dictionary constructing module 12, configured to input the first training data collected into the Word2Vec algorithm for training to obtain word vectors and construct the word vector dictionary after the first training data collected is segmented into words and special symbols are removed and non-Chinese characters are removed.

Furthermore, the Word2Vec algorithm for training is implemented by a gensim library in Python.

Preferably, the first convolutional neural network and the second convolutional neural network are constructed based on a tensorflow library in Python.

Preferably, the first multilayer convolution comprises 5 convolution layers, that is the first-type one-dimensional convolution layer and four groups of the second-type one-dimensional convolution layer, wherein the first-type one-dimensional convolution layer comprises one-dimensional convolution kernels corresponding to three types of length, the one-dimensional convolution kernels of each length corresponds to 128 channels, four groups of the second-type one-dimensional convolution layer comprise one-dimensional convolution kernels of a length of 3, and number of channels of the one-dimensional convolution kernels corresponding to the four groups of the second-type one-dimensional convolution layers is 384.

And/or, the second multilayer convolution comprises 3 convolution layers, that is the first-type one-dimensional convolution layer and two groups of the second-type one-dimensional convolution layer, wherein the first-type one-dimensional convolution layer comprises one-dimensional convolution kernels corresponding to three types of length, the one-dimensional convolution kernels of each length corresponds to 128 channels, two groups of the second-type one-dimensional convolution layers comprise one-dimensional convolution kernels of a length of 3, and number of channels of the one-dimensional convolution kernels corresponding to the two groups of the second-type one-dimensional convolution layers is 384.

Preferably, the first optimization algorithm and the second optimization algorithm are an ADAM algorithm or an rmsprop algorithm.

Preferably, the knowledge graph triplet extraction module 15, if the entity tagging prediction and the entity relationship prediction contradict with each other, knowledge graph triplet extraction of the to-be-predicted data is abandoned.

The equipment for knowledge extraction based on TextCNN provided and shown by the present disclosure implement a knowledge extraction link in a knowledge graph through a convolutional neural network, which effectively improves model training efficiency on the premise of ensuring accuracy. By converting the training text into a vector form and connecting to two types of convolutional neural network models, wherein convolutional layer forms of the two types of the convolutional neural network models are both one-dimensional convolution kernels, training text information can be extracted, named entity recognition and entity relationship recognition are realized respectively. Computing resources can be made full use of to improve computing efficiency due to parallel computing characteristics of convolutional neural networks, and the two types of trained convolutional neural network models implement automatic knowledge extraction through prediction fusion. Specifically, the to-be-predicted data is respectively converted into a character vector form and a word vector form, and connected to the first convolutional neural network and the second convolutional neural network to be processed, wherein the first convolutional neural network is used to realize the named entity recognition. Form of the convolutional neural network used is a form of full convolution, whose input is a character vector and whose output is an entity category boundary prediction. Through this process, original continuous text can be segmented into characters, and the characters related to the named entity can be kept and entity classification is performed. The second convolutional neural network realizes the knowledge extraction. The convolutional neural network used includes convolutional layers, pooling layers and so on, whose input includes character vectors and word vectors, and whose output is the relationship extraction recognition. Through this process, associations of knowledge entities in the text can be determined. Combining the entity tagging prediction with entity relationship prediction of the to-be-predicted data, entities and relationships existing in the entity tagging prediction and entity relationship prediction of the to-be-predicted data can be recognized, and the entities and relationships can be used to the knowledge graph triples extraction of the to-be-predicted data. Thereby, automatic knowledge extraction is realized, and the efficiency of model training is effectively improved on the premise of ensuring accuracy.

Embodiment 3

Figure 3:
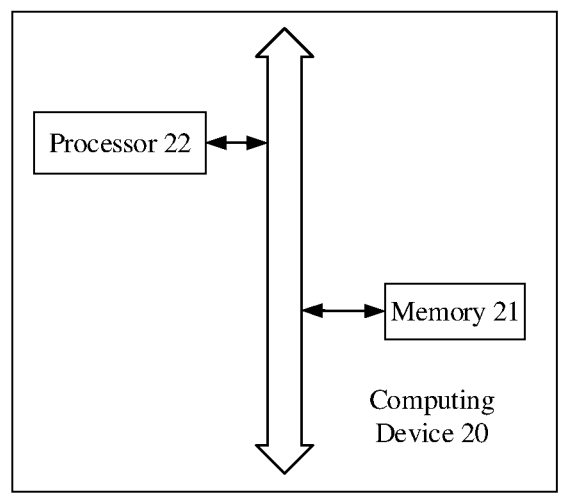
FIG. 3 illustrates a diagram of hardware architecture of a computing device for knowledge extraction based on TextCNN according to an embodiment of the present disclosure.

The present disclosure also provides a computer equipment, such as a smart phone, a tablet computer, a notebook computer, a desktop computer, a rack server, a blade server, a tower server, or a rack server (the rack server includes stand-alone servers, or server cluster consisting of multiple servers) that can execute programs, and so on. The computing device 20 of the embodiment comprises at least, but not limited to, a memory 21 and a processor 22, as shown in FIG. 3, the memory 21 and the processor 22 are communicatively connected to each other through a system bus. It should be noted that FIG. 3 only shows the computing device 20 with components 21-22, however it should be understood that it is not required to implement all illustrated components, and more or fewer components may be implemented instead.

In the embodiment, the memory 21 (ie, a readable storage medium) includes a flash memory, a hard disk, a multimedia card, a card-type memory (for example, SD or DX memory, etc.), a random access memory (RAM), a static random access memory (SRAM), a Read-only memory (ROM), an electrically erasable programmable read-only memory (EEPROM), a programmable read-only memory (PROM), a magnetic memory, magnetic disks, optical disks and so on. In some embodiments, the memory 21 may be an internal storage unit of the computing device 20, such as a hard disk or a memory of the computing device 20. In other embodiments, the memory 21 may also be an external storage device of the computing device 20, such as a plug-in hard disk, a smart media card (SMC), and a secure digital (SD) card, a flash card and so on. Of course, the memory 21 may also include both the internal storage unit and the external storage device of the computing device 20. In the embodiment, the memory 21 is generally used to store an operating system and kind of application software installed on the computing device 20, for example, program codes of the equipment 10 for knowledge extraction based on TEXTCNN of the embodiment 1. In addition, the memory 21 may also be used to temporarily store various types of data that have been output or are to be output.

The processor 22 may be a central processing unit (CPU), a controller, a microcontroller, a microprocessor, or other data processing chips in some embodiments. The processor 22 is generally used to control the overall operation of the computing device 20. In this embodiment, the processor 22 is configured to run the program codes or process data stored in the memory 21, for example, to run the equipment 10 for knowledge extraction based on TEXTCNN to implement the method for knowledge extraction based on TEXTCNN of the embodiment 1.

Embodiment 4

The present disclosure also provides a computer-readable storage medium, such as a flash memory, a hard disk, a multimedia card, a card-type memory (for example, SD or DX memory, etc.), a random access memory (RAM), a static random access memory (SRAM), a read-only Memory (ROM), an electrically erasable programmable read-only memory (EEPROM), a programmable read-only memory (PROM), a magnetic memory, magnetic disks, optical disks, servers, App application stores and so on, which store computer programs, when the programs executed by the processor, corresponding functions are implemented. The computer-readable storage medium of this embodiment is used to store the equipment 10 for knowledge extraction based on TEXTCNN, and when executed by a processor, performs the method for knowledge extraction based on TEXTCNN of embodiment 1.

The above serial numbers of the embodiments of the present disclosure are only for description, and do not represent advantages and disadvantages of the embodiments.

Through the description of the above embodiments it is clear to those skilled in the art that the above embodiments may be implemented by means of software plus the necessary common hardware platform and of course by hardware. But in many cases the former is the better way to do it.

The above are only preferred embodiments of the present disclosure, and thus do not limit the patent scope of the present disclosure. Any equivalent structure or equivalent process transformation made by using the description and drawings of the present disclosure, or directly or indirectly used in other related technical fields, is also included in the protection scope of the present disclosure.

What is claimed is:

1. A method for knowledge extraction based on TextCNN, comprising:

S10, collecting first training data, and constructing a character vector dictionary and a word vector dictionary;

S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn;

S21, collecting second training data, wherein the second training data is pre-labeled data, comprising a named entity position label and a named entity relationship label, and inputting the second training data into the first embedding layer after the second training data is divided into multiple characters and special symbols are removed;

S22, performing character vector matching on the second training data with character-level, based on the character vector dictionary, in the first embedding layer, to convert the second training data into a matrix form;

S23, wherein the first multilayer convolution performs a convolution operation on a matrix output from the first embedding layer, the first multilayer convolution comprises one group of first-type one-dimensional convolution layer located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S24, outputting the first multi-layer convolution via the first softmax function to determine prediction probabilities of BEMO tagging with a plurality of subdivision categories of each character;

S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network;

S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn;

S31, segmenting the second training data into words;

S311, performing a preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard;

S312, inputting the second training data into the second embedding layer after special symbols and non-Chinese characters in the preliminary word segmentation are removed;

S32, performing word vector matching on the second training data after segmenting, based on the word vector dictionary, in the second embedding layer, to convert the second training data into the matrix form;

S33, wherein, the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S34, inputting an output of the second multilayer convolution into the pooling layer for compression;

S35, inputting an output of the pooling layer into two fully-connected layers to perform information fusion of each channel;

S36, inputting an output of the fully-connected layers into the second softmax function to determine corresponding prediction probabilities of multiple entity relationship labels;

S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network;

S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probabilities of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

2. The method as in claim 1, wherein S10 comprises:

S11, inputting the first training data collected into a Word2Vec algorithm for training to obtain character vectors and construct the character vector dictionary, after the first training data collected is divided into characters and special symbols are removed and non-Chinese characters are removed;

S12, at the same time, inputting the first training data collected into the Word2Vec algorithm for training to obtain word vectors and construct the word vector dictionary, after the first training data collected is segmented into words and special symbols are removed and non-Chinese characters are removed.

3. The method as in claim 2, wherein the Word2Vec algorithm for training is implemented by a gensim library in Python.

4. The method as in claim 1, wherein the first convolutional neural network and the second convolutional neural network are constructed based on a tensorflow library in Python.

5. The method as in claim 1, wherein the first multilayer convolution comprises 5 convolution layers, wherein the first-type one-dimensional convolution layer comprises one-dimensional convolution kernels corresponding to three types of length, the one-dimensional convolution kernels of each length corresponds to 128 channels, four groups of the second-type one-dimensional convolution layers comprise one-dimensional convolution kernels of a length of 3, and number of channels of the one-dimensional convolution kernels corresponding to the four groups of the second-type one-dimensional convolution layers is 384;

and/or, the second multilayer convolution comprises 3 convolution layers, wherein the first-type one-dimensional convolution layer comprises one-dimensional convolution kernels corresponding to three types of length, the one-dimensional convolution kernels of each length corresponds to 128 channels, two groups of the second-type one-dimensional convolution layers comprise one-dimensional convolution kernels of a length of 3, and number of channels of the one-dimensional convolution kernels corresponding to the two groups of the second-type one-dimensional convolution layers is 384.

6. The method as in claim 1, wherein The first optimization algorithm and the second optimization algorithm are an ADAM algorithm or an rmsprop algorithm.

7. The method as in claim 1, in the S40, if the entity tagging prediction and the entity relationship prediction contradict with each other, knowledge graph triplet extraction of the to-be-predicted data is abandoned.

8. A computing device comprising a memory, a processor, and computer program stored in the memory and executable on the processor, wherein the processor executes the computer programs for implementing steps of a method for knowledge extraction based on TextCNN, the method comprising:

S10, collecting first training data, and constructing a character vector dictionary and a word vector dictionary;

S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn;

S21, collecting second training data, wherein the second training data is pre-labeled data, comprising a named entity position label and a named entity relationship label, and inputting the second training data into the first embedding layer after the second training data is divided into multiple characters and special symbols are removed;

S22, performing character vector matching on the second training data with character-level, based on the character vector dictionary, in the first embedding layer, to convert the second training data into a matrix form;

S23, wherein, the first multilayer convolution performs a convolution operation on a matrix output from the first embedding layer, the first multilayer convolution comprises one group of first-type one-dimensional convolution layer located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S24, outputting the first multi-layer convolution via the first softmax function to determine prediction probabilities of BEMO tagging with a plurality of subdivision categories of each character;

S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network;

S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn;

S31, segmenting the second training data into words;

S311, performing a preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard;

S312, inputting the second training data into the second embedding layer after special symbols and non-Chinese characters in the preliminary word segmentation are removed;

S32, performing word vector matching on the second training data after segmenting, based on the word vector dictionary, in the second embedding layer, to convert the second training data into the matrix form;

S33, wherein, the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation;

S34, inputting an output of the second multilayer convolution into the pooling layer for compression;

S35, inputting an output of the pooling layer into two fully-connected layers to perform information fusion of each channel;

S36, inputting an output of the fully-connected layers into the second softmax function to determine corresponding prediction probabilities of multiple entity relationship labels;

S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network;

S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probabilities of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

9. The computing device as in claim 8, wherein S10 comprises:

S11, inputting the first training data collected into a Word2Vec algorithm for training to obtain character vectors and construct the character vector dictionary, after the first training data collected is divided into characters and special symbols are removed and non-Chinese characters are removed;

S12, at the same time, inputting the first training data collected into a Word2Vec algorithm for training to obtain word vectors and construct the word vector dictionary, after the first training data collected is segmented into words and special symbols are removed and non-Chinese characters are removed.

10. The computing device as in claim 9, wherein the Word2Vec algorithm for training is implemented by a gensim library in Python.

11. The computing device as in claim 8 wherein the first convolutional neural network and the second convolutional neural network are constructed based on a tensorflow library in Python.

12. The computing device as in claim 8, wherein the first multilayer convolution comprises 5 convolution layers, wherein the first-type one-dimensional convolution layer comprises one-dimensional convolution kernels corresponding to three types of length, the one-dimensional convolution kernels of each length corresponds to 128 channels, four groups of the second-type one-dimensional convolution layers comprise one-dimensional convolution kernels of a length of 3, and number of channels of the one-dimensional convolution kernels corresponding to the four groups of the second-type one-dimensional convolution layers is 384;

and/or, the second multilayer convolution comprises 3 convolution layers, wherein the first-type one-dimensional convolution layer comprises one-dimensional convolution kernels corresponding to three types of length, the one-dimensional convolution kernels of each length corresponds to 128 channels, two groups of the second-type one-dimensional convolution layers comprise one-dimensional convolution kernels of a length of 3, and number of channels of the one-dimensional convolution kernels corresponding to the two groups of the second-type one-dimensional convolution layers is 384.

13. A non-transitory computer readable storage medium, storing computer programs thereon, the computer programs executed by a processor to implement steps of a method for knowledge extraction based on TextCNN, the method comprising: S10, collecting a first training data, and constructing a character vector dictionary and a word vector dictionary; S20, constructing a first convolutional neural network, and training the first convolutional neural network based on a first optimization algorithm, wherein the first convolutional neural network comprises a first embedding layer, a first multilayer convolution, and a first softmax function, wherein the first embedding layer, the first multilayer convolution, and the first softmax function are connected in turn; S21, collecting a second training data, wherein the second training data is pre-labeled data, comprising a named entity position label and a named entity relationship label, and inputting the second training data into the first embedding layer after the second training data is divided into multiple characters and special symbols are removed; S22, performing character vector matching on the second training data with character-level, based on the character vector dictionary, in the first embedding layer, to convert the second training data into a matrix form; S23, wherein the first multilayer convolution performs a convolution operation on a matrix output from the first embedding layer, the first multilayer convolution comprises one group of first-type one-dimensional convolution layer located at a front portion, and at least one group of second-type one-dimensional convolution layers located at a rear portion, the first-type one-dimensional convolution layers comprise one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation; S24, outputting the first multi-layer convolution via the first softmax function to determine prediction probabilities of BEMO tagging with a plurality of subdivision categories of each character; S25, training the first convolutional neural network, calculating a first cross-entropy of a loss function according to the prediction probability of BEMO tagging and a true BEMO label of the second training data, and minimizing the loss function through the first optimization algorithm to train the first convolutional neural network; S30, constructing a second convolutional neural network, and training the second convolutional neural network based on a second optimization algorithm, wherein the second convolutional neural network comprises a second embedding layer, a second multilayer convolution, a pooling layer, two fully-connected layers and a second softmax function, wherein the second embedding layer, the second multilayer convolution, the pooling layer, two fully-connected layers and the second softmax function are connected in turn; S31, segmenting the second training data into words; S311, performing preliminary word segmentation on the second training data using a jieba library, and correcting the preliminary word segmentation based on a prediction word segmentation of the first convolutional neural network, if the preliminary word segmentation is different from the predicted word segmentation of the first convolutional neural network, taking the predicted word segmentation of the first convolutional neural network as standard; S312, inputting the second training data into the second embedding layer after special symbols and non-Chinese characters in the preliminary word segmentation are removed; S32, performing word vector matching on the second training data after segmenting, based on the word vector dictionary, in the second embedding layer, to convert the second training data into the matrix form; S33, wherein the second multilayer convolution performs the convolution operation on the matrix output from the second embedding layer, the second multilayer convolution comprises one group of first-type one-dimensional convolution layer located at a front portion, and at least one group of second-type one-dimensional convolution layers located at a rear portion, the first-type one-dimensional convolution layer comprises one-dimensional convolution kernels with different number of lengths and the same number of channels, the second-type one-dimensional convolution layers comprise one-dimensional convolution kernels with the same number of lengths and the same number of channels, data of each convolution layer comes from an output of previous convolution layer, and number of matrix rows is maintained during the convolution operation; S34, inputting an output of the second multilayer convolution into the pooling layer for compression; S35, inputting an output of the pooling layer into two fully-connected layers to perform information fusion of each channel; S36, inputting an output of the fully-connected layers into the second softmax function to determine corresponding prediction probabilities of multiple entity relationship labels; S37, training the second convolutional neural network, calculating a second cross-entropy of the loss function according to predicted probability of a relationship label output by the second convolutional neural network and a true relationship label of the second training data, and minimizing the loss function through the second optimization algorithm to train the second convolutional neural network; S40, inputting to-be-predicted data into the first convolutional neural network after training and the second convolutional neural network after training, extracting a knowledge graph triple of the to-be-predicted data according to an entity tagging prediction output by the first convolutional neural network after training and an entity relationship prediction output by the second convolutional neural network after training, wherein a class corresponding to the maximum probability value in the prediction probability of BEMO tagging is selected as the entity tagging prediction output by the first convolutional neural network, a class corresponding to a prediction probability value which is greater than 0.5 is selected as the entity relationship prediction output by the second convolutional neural network, in order to extract the knowledge graph triplet of the to-be-predicted data.

14. The non-transitory computer readable storage medium as in claim 13, wherein S10 comprises: S11, inputting the first training data collected into a Word2Vec algorithm for training to obtain character vectors and construct the character vector dictionary, after the first training data collected is divided into character and special symbols are removed and non-Chinese characters are removed; S2, at the same time, inputting the first training data collected into a Word2Vec algorithm for training to obtain word vectors and construct the word vector dictionary, after the first training data collected is segmented into words and special symbols are removed and non-Chinese characters are removed.

15. The non-transitory computer readable storage medium as in claim 13, wherein the first convolutional neural network and the second convolutional neural network are constructed based on a tensorflow library in Python.

16. The non-transitory computer readable storage medium as in claim 13, wherein the first multilayer convolution comprises 5 convolution layers, wherein the first-type one-dimensional convolution layer comprises one-dimensional convolution kernels corresponding to three types of length, the one-dimensional convolution kernels of each length corresponds to 128 channels, four groups of the second-type one-dimensional convolution layers comprise one-dimensional convolution kernels of a length of 3, and number of channels of the one-dimensional convolution kernels corresponding to the four groups of the second-type one-dimensional convolution layers is 384; and/or, the second multilayer convolution comprises 3 convolution layers, wherein the first-type one-dimensional convolution layer comprises one-dimensional convolution kernels corresponding to three types of length, the one-dimensional convolution kernels of each length corresponds to 128 channels, two groups of the second-type one-dimensional convolution layers comprise one-dimensional convolution kernels of a length of 3, and number of channels of the one-dimensional convolution kernels corresponding to the two groups of the second-type one-dimensional convolution layers is 384.

* * * * *